United States Patent
Chevalier et al.

(10) Patent No.: US 7,062,227 B2
(45) Date of Patent: Jun. 13, 2006

(54) METHOD AND DEVICE FOR THE ESTIMATION OF A PROPAGATION CHANNEL FROM ITS STATISTICS

(75) Inventors: Pascal Chevalier, Courbevoie (FR);
Jean-Marie Chaufray, Paris (FR);
Philippe Loubaton, Villejuif (FR)

(73) Assignee: Thales, Paris (FR)

( * ) Notice: Subject to any disclaimer, the term of this patent is extended or adjusted under 35 U.S.C. 154(b) by 732 days.

(21) Appl. No.: 10/083,127

(22) Filed: Feb. 27, 2002

(65) Prior Publication Data
US 2002/0150176 A1    Oct. 17, 2002

(30) Foreign Application Priority Data
Feb. 27, 2001   (FR) .................................. 01 02653

(51) Int. Cl.
*H04B 17/00* (2006.01)
(52) U.S. Cl. .............................. 455/67.13; 455/67.11; 455/63.1; 455/226.1; 455/226.3; 375/227; 375/224
(58) Field of Classification Search ............. 455/9–10, 455/500–506, 63.1, 65, 67.11–67.16, 225, 455/226.1–226.3, 423–425; 375/224, 227, 375/340, 346
See application file for complete search history.

(56) References Cited

U.S. PATENT DOCUMENTS

| | | | |
|---|---|---|---|
| 5,640,432 A * | 6/1997 | Wales .......................... 375/346 |
| 5,752,168 A | 5/1998 | Monot et al. | |
| 5,812,090 A | 9/1998 | Chevalier et al. | |
| 5,870,430 A | 2/1999 | Pipon et al. | |
| 5,918,161 A * | 6/1999 | Kumar et al. .................. 455/65 |
| 6,118,832 A | 9/2000 | Mayrargue et al. | |
| 6,144,710 A * | 11/2000 | Chen et al. .................. 375/346 |
| 6,239,746 B1 | 5/2001 | Pipon et al. | |
| 6,240,098 B1 | 5/2001 | Thibault et al. | |
| 6,243,415 B1 | 6/2001 | Pipon et al. | |
| 6,311,043 B1 * | 10/2001 | Haardt et al. ............. 455/67.16 |
| 6,349,207 B1 | 2/2002 | Monot et al. | |
| 6,363,124 B1 * | 3/2002 | Cochran ...................... 375/326 |
| 6,434,366 B1 * | 8/2002 | Harrison et al. .............. 455/69 |
| 6,671,313 B1 * | 12/2003 | Rached et al. .............. 375/224 |

OTHER PUBLICATIONS

A. Desmézières, et al., Proceedings of 1999 2nd Workshop on Signal Processing Advances in Wireless, pp. 395-398, XP-002178929, "Polarization in Space-Time Processing For Propagation Channel Identification", May 9-12, 1999.

(Continued)

*Primary Examiner*—Nick Corsaro
*Assistant Examiner*—Tuan Tran
(74) *Attorney, Agent, or Firm*—Oblon, Spivak, McClelland, Maier & Neustadt, P.C.

(57) ABSTRACT

A method and device to estimate the impulse response h of a propagation channel in a system comprising at least one or more sensors, comprising at least one step for estimating the statistics of the additive noise resulting from the interference and from the thermal noise on the basis of the statistics of the received signal

26 Claims, 5 Drawing Sheets

OTHER PUBLICATIONS

M. Chenu-Tournier, et al., Proceedings of the 2000 IEEE Sensor Array and Multichannel Signal Processing, pp. 12-16, XP-002179594, "A Parametric Spatio-Temporal Channel Estimation Technique For FDD UMTS Uplink", Mar. 16-17, 2000.

H. Gazzah, et al., 2000 IEEE International Conference on Acoustics, Speech, and Signal Processing, vol. 5, pp. 2717-2720, XP-002179595, "A Blind Identification Algorithm Robust To Order Over Estimation", Jun. 5-9, 2000.

L. Tong, et al., Proceedings of the IEEE, vol. 86, No. 10, pp. 1951-1968, XP-000859736, "Multichannel Blind Identification: From Subspace To Maximum Likelihood Methods", Oct. 1998.

U.S. Appl. No. 10/083,127, filed Feb. 27, 2002, pending.
U.S. Appl. No. 10/221,178, filed Sep. 20, 2002, pending.
U.S. Appl. No. 10/020,934, filed Dec. 19, 2001, pending.
U.S. Appl. No. 10/060,249, filed Feb. 1, 2002, pending.
U.S. Appl. No. 10/083,127, filed Feb. 27, 2002, pending.

* cited by examiner

FIG.6

METHOD AND DEVICE FOR THE ESTIMATION OF A PROPAGATION CHANNEL FROM ITS STATISTICS

BACKGROUND OF THE INVENTION

1. Field of the Invention

The present invention relates to a method for the estimation of a propagation channel from its statistics.

It can be applied in the third-generation mobile telephony networks commonly known as UMTS networks.

It can also be applied to multiple-sensor receivers used for functions of metrology, capacity augmentation, or again for radio-monitoring functions.

2. Description of the Prior Art

In a transmission system, especially one using radio waves, a transmitter sends out a signal in a transmission channel to a receiver. The signal that is sent undergoes amplitude and phase fluctuations in the transmission channel. The signal received by the receiver consists of time-shifted and modified copies of the signal sent. The fluctuations of the signal and the shifts generate interference known by those skilled in the art as intersymbol interference. This interference arises especially from the law of modulation used for the transmission and also from multipath propagation in the channel.

The received signal generally results from a large number of reflections in the channel, the different paths taken by the transmitted signal leading to various delays in the receivers. Thus, the impulse response of the channel represents all the fluctuations undergone by the transmitted signal.

The forthcoming arrival of UMTS networks is obliging equipment manufacturers and suppliers to adapt metrology, capacity-augmentation and radio-monitoring tools to this new standard. The performance characteristics of these tools rely partly on the estimation of the effect of the propagation medium (the radio channel) on the signals sent by the different entities of the network (base station, mobile units etc). This operation is known as propagation channel estimation. It can be used especially to counter the effect of the propagation to improve the quality of the signal received (by equalization) or to bring out information on the propagation medium (namely the directions of arrival and the path delays) in order to implement spatial processing operations such as direction-finding, Modelling Signal sent The composition of the UMTS signal sent by the base station to the mobile units (in the downlink) may be modelled for example according to the scheme shown in FIG. 1.

Figure 1:
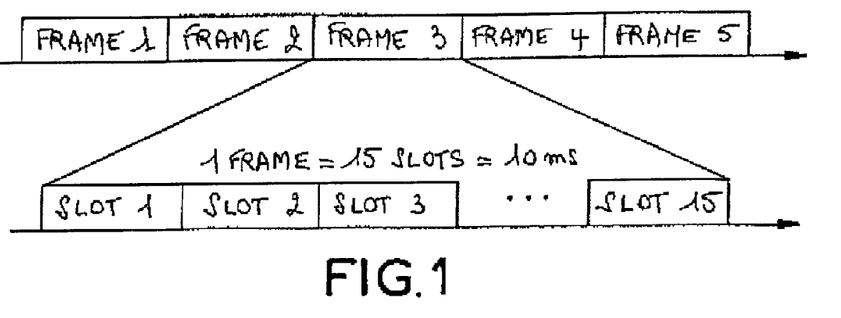
FIG. 1 shows the composition of the UMTS signal.

The signal s(t) consists of several frames, each frame having a fixed duration and comprising a given number of slots. For example a 10 ms frame comprises 15 slots.

Figure 2:
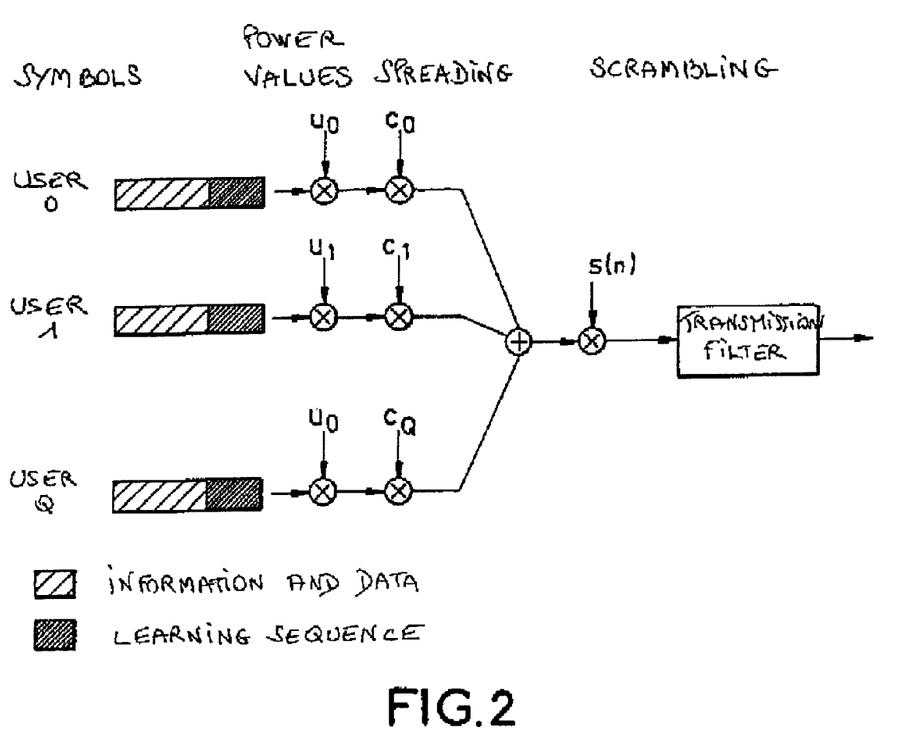
FIG. 2 shows the modelling of the signal for a downlink.

FIG. 2 gives a diagrammatc view of a modulator for the downlink (from the base station to mobile units).

The Q-PSK (Quadrature Phase Shift keying) symbols, referenced $b_q(0), \ldots, b_q(N_s-1)$, intended for a user q, are first of all multiplied by a power factor $\mu q$, with Ns being the number of symbols sent to this user. Each symbol is then modulated by a sequence known as a spreading sequence, referenced $c_q$ with a value of $\pm 1$, and a size $N_q$ (spreading factor). Thus, the symbol $b_q(I)$ is used to form the sequence $\mu_q b_q(I) c_q(0), \ldots, \mu b_q(I) C_q(N_q-1)$, where I is the index of the symbol.

The sequences $c_q$ are orthogonal so that:

$$\sum_{n=0}^{\min(N_q-N_p)} c_q(n)c_p(n) = N_q \quad \text{if } p = q$$

Else it is equal to 0

The sequences thus formed are then multiplied term by term by a sequence of symbols, $(\pm 1 \pm i)$, called a scrambling code s. This sequence is periodic, with a frame period, and is built so as to simulate a random signal.

The resulting signal to be sent is therefore written as follows:

$$y(n) = \sum_{q=0}^{Q} \mu_q b_q\left(\left\lfloor \frac{n}{N_q} \right\rfloor\right) c_q(n[N_q])s(n)$$

with s(n) being the scrambling at a given point in time n where $\lfloor \rfloor$ designates the "integer part" operator and [ ] designates the "modulo" operator. This can also be written as: (1)

$$y(n) = \sum_{q=0}^{Q} \mu_q d_q(n) \tag{1}$$

with:

$$d_q(n) = b_q\left(\left\lfloor \frac{n}{N_q} \right\rfloor\right) c_q(n[N_q])s(n) \tag{2}$$

This signal goes to a transmission filter and is than broadcast by the base station to the mobile units.

Signal received by a mobile unit

The signal is received on a network of sensors after crossing the radio channel. After sampling, it can take the form:

$$x(n) = \sum_{k=0}^{L-1} y(n-k)h(k) + b(n) \tag{3}$$

where the bold characters designate vectors, and

L corresponds to the spread of the channel expressed in number of chips, the indices n and k correspond to chips.

x(n) represents:

when the sampling is done at the chip rate, x(n) is the vector of the signals received at the instant n on each sensor, when over-sampling is done at a rate corresponding to one chip/2, x(n) is the vector of the signals received at the instants n and n+chip/2.

h(k) is the multi-sensor channel, and b(n) is an additive noise combining the interference phenomena coming from the other base stations and the thermal noise.

Signal received by a station

Figure 3:
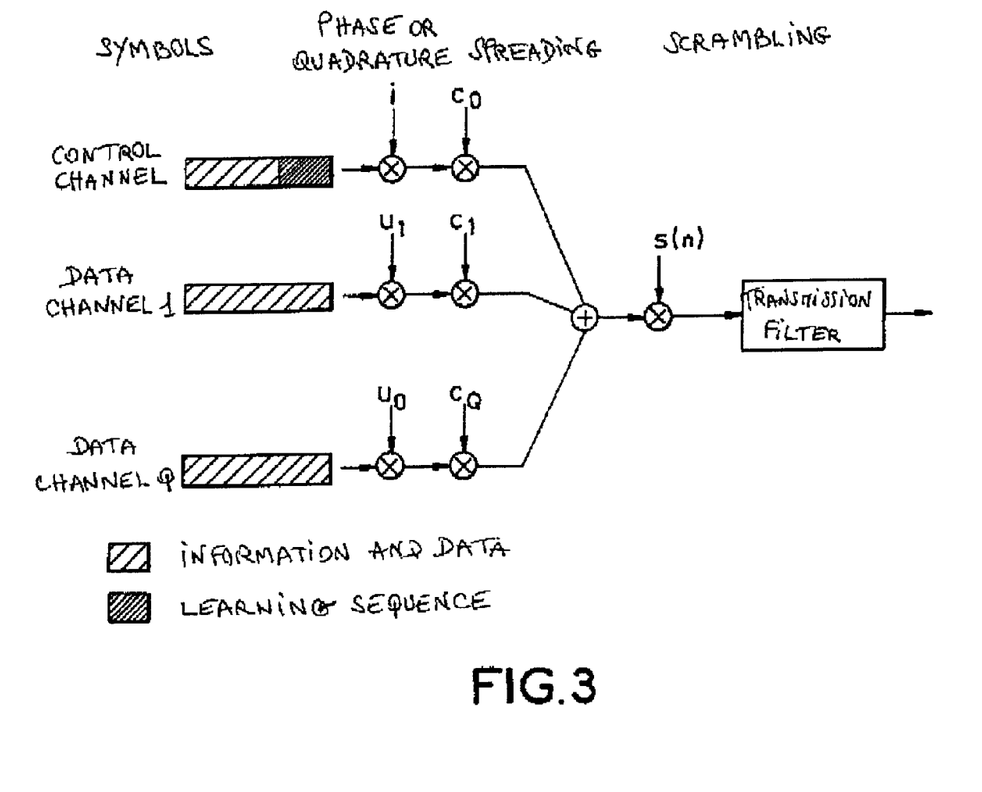
FIG. 3 is a schematic drawing of a first alternative implementation of the invention.

FIG. 3 gives a diagrammatic view of one possibility of modelling the uplink (from the mobile units to base station) described in detail here below in the context of the method according to the invention.

Known methods

There are many known methods for estimating the response of a propagation channel.

For example, one classic method proceeds by correlation of the received signal with shifted versions of a known learning sequence of the receiver. Of this sequence, only the steps needed for the understanding of the invention are recalled here below.

For the user 0, for example, the channel impulse response Is estimated, in a classic manner, by correlating several shifted versions of the received signal x(n+k) (one version being shifted by the sample k) by the learning sequence:

$$\hat{h}(k) = \frac{1}{N_0 P} \sum_{n=0}^{N_0 P} s(n)^* c_0(n[N_0]) b_0 \left( \left\lfloor \frac{n}{N_0} \right\rfloor \right)^* x(n+k) \quad (4)$$

where P represents the number of learning symbols, and $N_0 P$ the number of learning chips, or the number of pilot chips By combining the equations (1), (2), (3) and (4), the detailed expression of the estimated channel corresponds to (5):

$$\hat{h}(k) = \sum_{l=0}^{L} h(l) \frac{1}{N_0 P} \sum_{n=0}^{N_0 P - 1} d_0(n+k-l) d_0^*(n) +$$

$$\sum_{q=1}^{Q} \mu_q \sum_{l=0}^{L} h(l) \frac{1}{N_0 P} \sum_{n=0}^{N_0 P - 1} d_q(n+k-l) d_0^*(n) +$$

$$\frac{1}{N_0 P} \sum_{n=0}^{N_0 P - 1} b(n+k) d_0^*(n)$$

The properties of the sequences $d_q(n)$ are such that (6):

$$\frac{1}{N_0 P} \sum_{n=0}^{N_0 P - 1} d_0(n+k-l) d_0^*(n) = 1 \quad si \ k = l$$

$$= \frac{1}{\sqrt{N_0 P}} \quad sinon$$

$$\frac{1}{N_0 P} \sum_{n=0}^{N_0 P - 1} d_q(n+k-l) d_0^*(n) = \frac{1}{\sqrt{N_0 P}}$$

Thus, the estimate of the channel impulse response is expressed as a function especially of the response of the channel h (k) and of the three terms representing existing interference (7):

$$\hat{h}(k) = h(k) + \sum_{l=0, l \neq k}^{L} h(l) \frac{1}{N_0 P} \sum_{n=0}^{N_0 P - 1} d_0(n+k-l) d_0^*(n) +$$

$$\sum_{q=1}^{Q} \mu_q \sum_{l=0}^{L} h(l) \frac{1}{N_0 P} \sum_{n=0}^{N_0 P - 1} d_q(n+k-l) d_0^*(n) +$$

-continued $$\frac{1}{N_0 P} \sum_{n=0}^{N_0 P - 1} b(n+k) d_0^*(n)$$

where Q is the number of users of the propagation channel, l, k are indices corresponding to chips, and n is the index of the instant considered Three types of interference disturbing the estimation are thus identified:

the first term corresponds to the self-correlation for the sequence $d_o$, the second term corresponds to the interference from the other users, and the third term corresponds to the contribution of the external noise and the thermal noise.

This technique is efficient when the learning sequence is long and when the propagation channel does not change or undergoes little change in time. In the case of a fast variation of the propagation channel, it becomes necessary to estimate it on fairly short periods of time.

Another technique, known as the "least error squares technique" improves the above method by removing the need for self-correlations of the learning sequence.

The patent FR 2 762 164 discloses a method to estimate the impulse response of the transmission channel. This method uses the estimation of the space-time covariance matrix Γ of the impulse response of the channel. The method considers that the estimation noise is white, with a power B, and independent of the channel. In this case, the matrix Γ is estimated by $\hat{\Gamma} = \hat{\Delta} - BI$ with Δ being the matrix of space-time covariance of the estimated channel. If B is unknown, it can be estimated by the smallest eigenvalue of the estimated matrix Δ. It can also be fixed at a threshold value, Such an assumption is perfectly suited to a system in which a propagation channel is dedicated to a user, for example the GSM system. Furthermore, the proposed technique relates to single-sensor receivers.

However, a method of this kind is no longer suited to signals including several users, such as the UMTS signals where the noise Is neither white nor independent of the channel, especially owing to multiple-user interference.

An object of the present invention is a method to estimate the propagation channel from its statistics, which are themselves estimated by expressing especially the noise from the matrix of empirical correlation of the observations.

SUMMARY OF THE INVENTION

The invention relates to a method to estimate the impulse response h of a propagation channel in a system comprising at least one or more sensors. The method comprises at least one step for estimating the statistics of the additive noise resulting from the interference and from the thermal noise on the basis of the statistics of the received signal.

The step for estimating the covariance matrix of the noise is carried out, for example, on the basis of the empirical covariance matrix of the observations Rx and the number of pilot chips of a learning sequence transmitted with the signal, the noise matrix being expressed in the form $$\frac{1}{N_0 P} \hat{R}_x$$

The method is used for example to estimate the impulse response of a propagation channel in the UMTS field for uplinks and/or downlinks between a base station and one or more mobile units.

The invention also relates to a reception device adapted to estimating the impulse response of a propagation channel, The device comprises one or more sensors for the reception of the signal, a means to sample the received signal, a means adapted to estimating the noise from the statistics of the channel.

The receiver according to the invention may comprise a means adapted to estimating the noise from the empirical covariance matrix of the observations $\hat{R}_x$ and from the number of pilot chips of a learning signal transmitted with the signal, the matrix of the noise being expressed in the following form:

$$\frac{1}{N_0 P} \hat{R}_x$$

According to one alternative embodiment, it comprises for example a means adapted to determining the impulse response of the channel in the form:

$$\tilde{H}_m = \left[\frac{1}{M}\sum_{m=1}^{M} \hat{H}_m \hat{H}_m^H - \frac{1}{N_0 P} \hat{R}_x\right] \Delta^{-1} \hat{H}_m$$

The receiver is used, for example, in the field of UMTS.

The invention has the advantage especially of estimating a propagation channel comprising several users, for which the noise is neither white nor independent.

BRIEF DESCRIPTION OF THE DRAWINGS

Other features and advantages of the invention shall appear more clearly from the following description in which exemplary modes of implementation are proposed by way of an illustration, with reference to the appended figures, of which:

FIG. 6 shows comparative results obtained by using different methods of estimation In order to provide for a clear understanding of the object of the present invention, the following description, given by way of an illustration that in no way restricts the scope of the invention, is applied in the UMTS field to estimate a propagation channel especially on the basis of its statistics.

The term "statistics" designates, for example, the space-time covariance of the impulse response of the channel.

Figure 5:
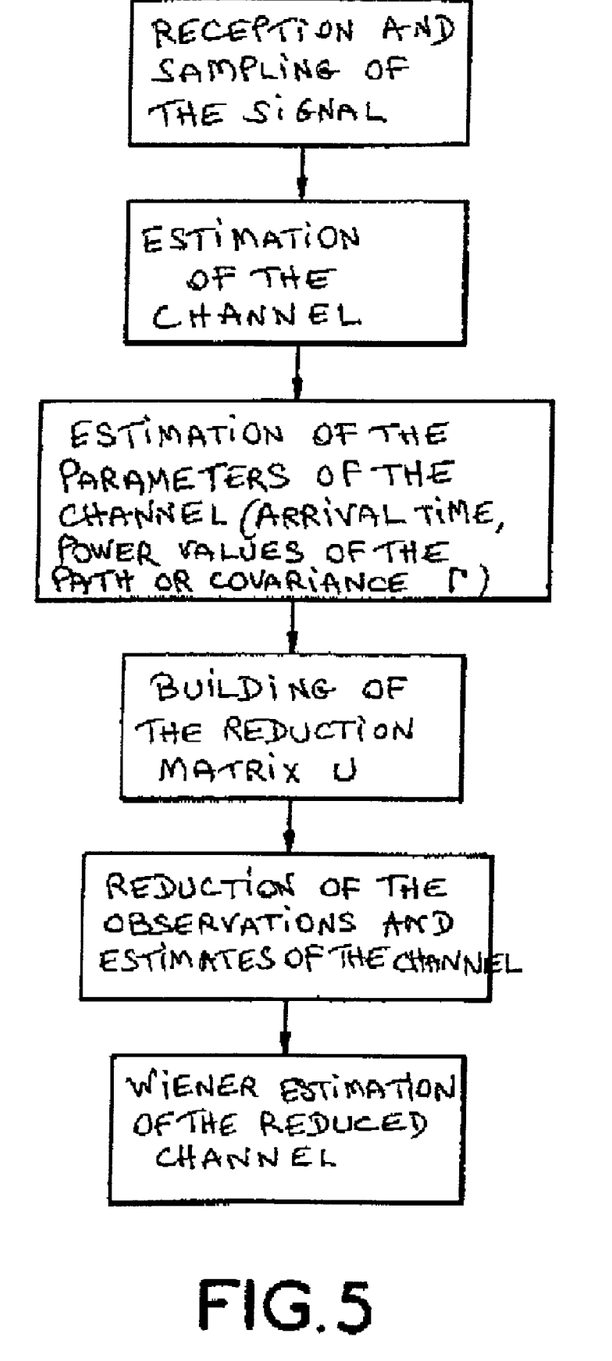
FIG. 5 shows a second alternative mode of implementation of the invention.

This system makes use of signals such as those described respectively with reference to FIG. 1 for a downlink, namely the signal sent from the base station to the mobile units, and with reference to FIG. 5 for an uplink corresponding to the signal sent from a mobile unit to the base station.

By applying a realistic statistical model to the propagation channel, namely a model based on the assumption that the propagation channel can be likened to a finite impulse response filter, it is possible to improve the existing techniques of channel estimation, in taking account of the statistics of the channel.

Modelling of the Radio Channel

The radio channel can be modelled as a sum of paths, each path being characterized by an arrival time, an attenuation and a phase shift. The modelling considered in the context of the invention uses the assumption according to which the attenuation and the phase shift of a path change rapidly as compared with the changes in the arrival time of the different paths. The channel may then be represented as a stationary random process. Thus, it can be said that each implementation of the channel is governed by the same statistics (the term "implementation" herein designates the value taken by the channel on a given slot, i.e. $H_m$).

Thus, for a given slot with an index m, where m varies from 1 to M, for example, the vector of the coefficients of the sampled channels corresponding to each sensor of the receiver is referenced (8);

$$H_m = [h_m(0)^H h_m(1)^H \ldots h_m(L)^H]^H$$

Where the exponent H corresponds to the Hermitian transpose, L corresponds to the number of samples, and m is the index of the slot of the signal received.

It is assumed that $H_m$ remains constant throughout the duration of the slot, but that for $m \neq m'$, $H_m \neq H_{m'}$.

Similarly, the channel is estimated at each slot m, and its estimate is referenced $\hat{H}_m$. The Invention uses for example the method of successive correlations known to those skilled in the art.

Since the Impulse response of the channel is estimated for all the slots m of the received signal, it is possible to improve this estimate $\hat{H}_m$, by implementing methods known to those skilled in the art.

The exemplary implementation of the method according to the invention, given by way of illustration, makes use of a Wiener estimation, known to those skilled in the art, the principles of which shall not be described in detail. The Wiener estimation method is described for example in A. Blanc-Lapierre and B, Pichinbono, *Fonctions Aléatoires* (Random Functions), Masson 1981. Any other method of estimation that improves the channel estimate may be used without departing from the scope of the invention.

The Wiener Estimation of the Channel

In the Wiener estimation of the channel, the estimate $\hat{H}_m$ is improved by means of a linear transform of $\hat{H}_m$. This transform is chosen so as to minimize the root-mean-square error between the true channel and the improved estimate.

The improved estimate of the impulse response of the channel for a slot m takes account of the covariance matrix of the channel and the covariance matrix of the estimated channel and is written for example (9):

$$\Gamma \Delta^{-1} \hat{H}_m$$

where $\Gamma$ represents the covariance matrix of the channel:

$$\Gamma = E[H_m H_m^H]$$

with $H_m$ being the vector defined in the expression (8) which remains constant or practically constant throughout the duration of the slot, and $\Delta$ represents the covariance matrix of the estimated channel:

$$\Delta = E[\hat{H}_m \hat{H}_m^H]$$

The idea of the invention consists especially in estimating the covariance of the estimation noise in order to deduct it from the covariance matrix of the estimated channel $\Delta$ in order to deduce the covariance matrix of the channel $\Gamma$ therefrom. From these two values, it is then possible to deduce the improved estimate of the impulse response of the propagation channel.

The noise estimation corresponds to the difference between the estimated channel $\hat{H}_m$ and the real channel $H_m$. This noise results especially from interference and other noise sources affecting the signal during the channel estimation procedure.

To this end, the method uses the estimation of the statistics of the channel as described here below, Estimation of $\Delta$, Covariance Matrix of the Estimated Channel This matrix can be estimated in a way known to those skilled in the art, assuming that, during a number M of slots, estimates of the channel $\hat{H}_m$ have been accumulated for which the arrival time is have not changed or has hardly changed. By means of these estimates, with m varying from 1 to M and in using a principle known to those skilled in the art (the estimator chosen is the best unskewed estimator for example), it is possible to estimate the matrix $\Delta$ containing the second-order statistics of the estimate of the channel.

The matrix $\Delta$ is then estimated by (10)

$$\hat{\Delta} = \frac{1}{M} \sum_{m=1}^{M} \hat{H}_m \hat{H}_m^H$$

This estimator is consistent inasmuch as it converges on the true matrix $\Delta$ when the number of observations tends towards infinity.

Estimation of the Covarlance $\Gamma$ of the Channel

It is expressed in taking account of the estimated matrix (10)

$$\hat{\Delta} = \frac{1}{M} \sum_{m=1}^{M} \hat{H}_m \hat{H}_m^H$$

and of the estimated matrix of covariance of the noise (11) expressed in the form:

$$\frac{1}{N_0 P} \hat{R}_x$$

where $\hat{R}_x$ is the empirical correlation matrix of the observations,

Let L be the number of samples of the channel to be estimated and K the number of sensors, the matrix $R_x$ has a size KL*KL. It may be considered to be a temporal matrix with a size L*L whose elements are space matrices sized K*K.

On the ith line and the jth column, (i and j varying from 1 to L) of the temporal matrix, the space matrix (K*K) $R_{xij}$ is estimated by the sum on n of the values $x(n+i)x(n+j)^H$ or, in an equivalent way, of the values $x(n+i)x(n)^H$ or again of the values $x(n)x(n+j-i)^H$.

The covariance matrix of the channel is estimated by (12):

$$\Gamma = \frac{1}{M} \sum_{m=1}^{M} \hat{H}_m \hat{H}_m^H - \frac{1}{N_0 P} \hat{R}_x$$

$R_x$ being an estimator consisting of the matrix $\Gamma$, when the number of observations M tends towards infinity, this quantity converges on $\Gamma$.

Estimation of the Pulse Response of the Propagation Channel

The pulse response of the channel $H_m$ is then estimated again from the estimated covariance matrix (12) and from the inverse of the covariance matrix of the estimated channel in applying, for example, the Wiener estimation method or any other method used to improve an estimate by means of its statistics.

There is, for example, a known first estimated value $\hat{H}_m$ for the propagation channel $H_m$, for example, the one used to estimate the covariance of the estimated channel and the Wiener estimator, namely the expression (9), is applied to deduce therefrom the new estimated value $\tilde{H}_m$ of the propagation channel $H_m$ (13).

$$\tilde{H}_m = \left[ \frac{1}{M} \sum_{m=1}^{M} \hat{H}_m \hat{H}_m^H - \frac{1}{N_0 P} \hat{R}_x \right] \Delta^{-1} \hat{H}_m$$

A summary of the different steps of the method according to the invention is given in FIG. 3, in the form of an algorithm comprising the following steps:
Reception and sampling of the multisensor signal, (a),
storage of the successive observation vectors, for example in the memory, (b)
estimation of the matrix $\hat{R}_x$, (c)
estimation of the channel by correlation of the signal with the learning sequence, (d)
storage of the successive estimates $\hat{H}_m$ of the channel $H_m$, (e)
estimation of the matrix $\Delta$, (f)
estimation of the matrix $\Gamma$, from the estimates (c) and (f), and by using the expression of the estimates of the noise in the form $$\frac{1}{N_0 P} \hat{R}_x \qquad (g)$$

improvement of the estimates of the channel by applying for example the Wiener method to the estimates (e), (f) and (g).

The estimates are computed for example by means of a microprocessor programmed accordingly. This microprocessor may also be adapted for the execution of the steps of the method according to the invention.

The microprocessor may be connected with a processing device using the estimated values of the channel to implement a demodulation or a direction-finding operation as described very briefly here below.

The method described here above in the context of downlinks can also be applied for uplinks, namely links from a mobile station to a base station, without departing from the framework of the invention.

Figure 4:
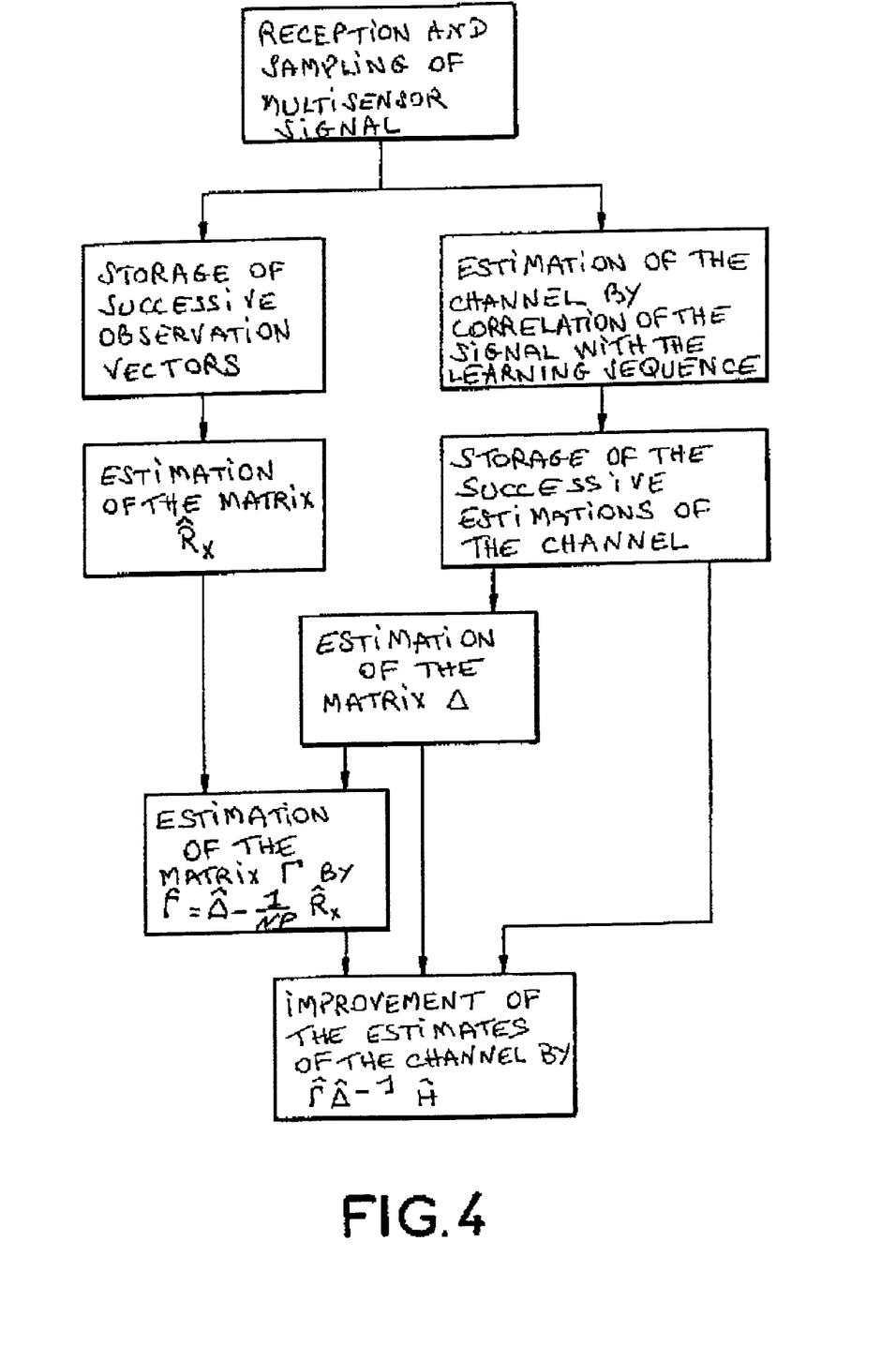
FIG. 4 shows an exemplary signal for the uplink (between a mobile station and a base station)

FIG. 4 is a drawing of the demodulator in the case of an uplink.

The mobile unit sends out a single control channel, containing a learning sequence for the channel estimation and signalling information, as well as one or more data channels. The data channels are all sent out at the same power, either on the in-phase channel or on the quadrature channel. The symbols sent on each channel are B-PSK (±1) (Binary Phase Shift Keying) symbols, The model chosen for the downlink can be adapted to the uplink in considering the control channel as the user being attended to, and the data channels as the other users of the cell. The other mobile units transmitting to the same base station are processed similarly to the other cells for the downlink. They are included in the total noise.

The steps of the method described in the context of the downlink can be applied with these assumptions.

FIG. 5 shows an exemplary implementation of steps to reduce the rank of the matrices used during the method.

For example, the steps run as follows:
a reception and sampling of the signal, (a)
estimation of the propagation channel (d,e)
estimation of the parameters of the channel (arrival time, power of the paths, etc)
building of the reduction matrix,
reduction of the observations and of the estimates of the channel, in carrying out the steps described here above (c) (f) (g) in the normal case, in using the reduction matrix,
Wiener estimation of the reduced channel.

It is possible to improve both the efficiency and the complexity of this method by resorting to the reduction of the channel space. This technique consists in parametrizing the channel space by means of an orthonormal base constituted by a small number of vectors.

Indeed, generally, in the context of radio channel transmission, owing to the specular nature of the channel (with a restricted number of paths in the channel), the matrix $\Gamma$ is said to be a "deficient ranking" matrix. This means that the vectors $H_m$ are deduced from a linear combination of a small number of vectors $u_1, \ldots u_p$ forming a base of the channel space. If these vectors were to be known, it would then be enough to estimate the linear combination $g_{m,1}, \ldots g_{m,p}$ used to rebuild $H_m$ by:

$$H_m = \sum_{p=1}^{P} g_{m,p} u_p$$

Let us group $g_{m,1} \ldots, g_{m,p}$ in a vector $g_m$ and $u_1, \ldots, u_p$ in a matrix U. We then have:

$H_m = U g_m$

The vector $g_m$ has a size (far) smaller than $H_m$. It is therefore simpler to implement the Wiener estimator of $g_m$ than $H_m$. It is possible indeed to estimate $g_m$ by:

$\hat{g}_m = U^H \hat{H}_m$

Hence, it is possible to estimate the covariance matrices $\Lambda$ and $\Xi$ of and of $0^H X_m$, where $X_m$ represents the vector of the observations $[x_m(0)^H, \ldots, x_m(L)^H]^H$ received at the slot m. It is then possible to estimate matrix $\omega$ which is the covariance matrix of $g_m$.

$$\hat{\Omega} = \hat{\Lambda} - \frac{1}{NP}\hat{\Xi}$$

and $\tilde{g}_m = \hat{\Omega}\hat{\Xi}^{-1}\hat{g}_m$

For which a new estimate of the channel is deduced:

$\tilde{H}_m = U\tilde{g}_m$

In practice, the vectors $u_1, \ldots, u_p$ are not known, but they can be estimated in several ways:
Eigen vectors associated with the greatest eigenvalues of the estimated matrix $\Gamma$. This technique must be implemented with a method for determining the number of eigen vectors to be chosen.
Canonical vectors associated with the greatest values of the diagonal of $\Gamma$. This technique amounts to keeping only the coefficients of the channel whose power exceeds a threshold that is set beforehand. It is not necessary to estimate $\Gamma$ entirely but only its diagonal, which is far simpler.
Vectors associated with the shaping filter shifted by the delays of the channel. This technique can be implemented only if the delays of the different paths of the channel have first of all been determined. A standardization step must be planned.

The rank reduction step can be implemented before the different steps of the method according to the invention, or again after the steps depending on the cases of application.

The method according to the invention is used for example to demodulate signals or again to carry out direction-finding operations.

Demodulation

Figure 6:
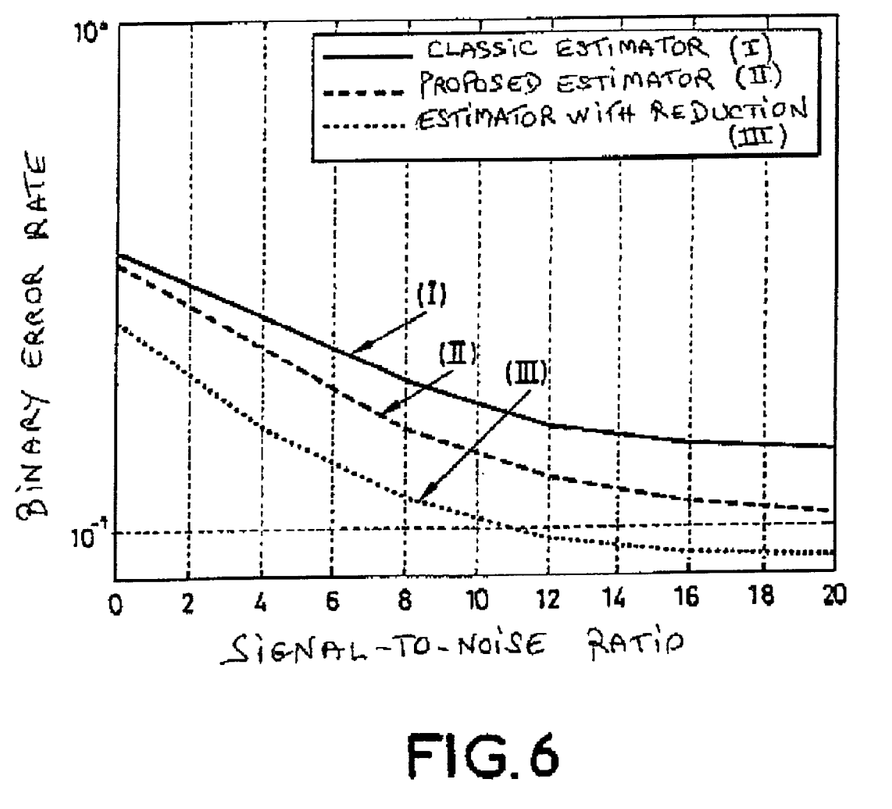

FIG. 6 gives a view, in a graph of the binary error rate as a function of the signal-to-noise ratio, of the performance characteristics of the different estimates.

The curve (I) corresponds to a classic estimator, obtained by the correlation method, the curve (II) being a curb obtained by implementing the steps of the method according to the invention and the curve (III) corresponding to the results obtained by the additional use of a step for reducing the rank of the matrix.

Many techniques of demodulation rely on knowledge of the propagation channel. The RAKE receiver, for example, estimates the transmitted symbol from the phase of the quantity:

$$\hat{b}_0(l) = \frac{1}{N_0}\sum_{n=0}^{N_0-1}\sum_{k=0}^{L} s(lN_0+n)'c_0(n)h(k)^H \times (lN_0+n+k)$$

When the propagation channel is not known, which is always the case in practice, an estimation of this channel is done. In FIG. 4, the performance characteristics of our estimator (and of its reduced rank version) are compared with that of the standard estimator for the RAKE receiver.

The new estimator and, to an even greater extent, the reduced rank estimator, give major gains in terms of performance characteristics.

Co-Operative Direction Finding

The invention can be applied especially to the improvement of direction finding measurements.

Indeed, in direction-finding, the angles of arrival of the different propagation paths are determined by estimating the vector h at the different instants of arrival. The co-operative estimation of the arrival times and of the associated channels is done by means of a learning sequence. It is therefore possible to improve it by implementing the method according to the invention. The precision of estimation of the angles of arrival is directly related to the quality of estimation of h. When the estimated channel is noise-infested, the measured angle is in a cone centered on the real angle. Improving the estimation of h reduces the difference between the measured angle and the real angle. This improves the resolution of the processing.

What is claimed is:

1. A method to estimate an impulse response h of a propagation channel in a system comprising at least one sensor, the method comprising:
    estimating statistics of an additive noise resulting from an interference and from a thermal noise on a basis of statistics of a received signal; and
    estimating a covariance matrix of a noise from an empirical covariance matrix of observations $\hat{R}_x$ and a number of pilot chips of a learning sequence transmitted with the received signal.

2. A method according to claim 1, wherein the covariance matrix of the noise is expressed in a form:

$$\frac{1}{N_0 P} \hat{R}_x$$

in which $N_0 P$ is the number of pilot chips.

3. A method according to one of the claims 1 and 2 further comprising:
    estimating a covariance matrix $\Gamma$ of the propagation channel.

4. A method according to claim 3, wherein the estimation of the impulse response of the propagation channel uses a Wiener method.

5. A method according to claim 4, further comprising:
    parametrizing a propagation channel space by an orthonormal base constituted by a given number of vectors $u_1, u_2, \ldots, u_p$.

6. A method according to claim 4, wherein the impulse response of the propagation channel is estimated between a base station and at least one mobile unit in an UMTS (Universal Mobile Telecommunications System) field for uplinks and/or downlinks.

7. A method according to claim 3, wherein the covariance matrix is estimated in a form:

$$\Gamma = \frac{1}{M} \sum_{m=1}^{M} \hat{H}_m \hat{H}_m^H - \frac{1}{N_0 P} \hat{R}_x$$

in which $\hat{H}_m$ is an estimated value for the propagation channel, $N_0 P$ is the number of pilot chips, $\hat{H}_m^H$ is a conjugate transpose of the estimated value for the propagation channel, and M a number of slots.

8. A method according to claim 3, wherein the impulse response of the $$\tilde{H}_m = \left[ \frac{1}{M} \sum_{m=1}^{M} \hat{H}_m \hat{H}_m^H - \frac{1}{N_0 P} \hat{R}_x \right] \Delta^{-1} \hat{H}_m$$

in which $\hat{H}_m$ is an estimated value for the propagation channel, $\Delta$ is a covariance matrix of the estimated channel, $N_0 P$ is the number of pilot chips, $\hat{H}_m^H$ is a conjugate transpose of the estimated value for the propagation channel, M is a number of slots, and $\tilde{H}_m$ is a new estimated value for the propagation channel $\hat{H}_m$.

9. A method according to claim 1, further comprising:
    parametrizing a propagation channel space by an orthonormal base constituted by a given number of vectors $u_1, u_2, \ldots, u_p$.

10. A method according to claim 9, wherein the vectors $u_1, u_2, \ldots, u_p$ correspond to associated with highest eigenvalues of the covariance matrix $\Gamma$.

11. A method according to claim 9, wherein the vectors $u_1, u_2, \ldots, u_p$ are canonical vectors associated with positions of highest values of a diagonal of the covariance matrix $\Gamma$.

12. A method according to claim 9, wherein the vectors $u_1, u_2, \ldots, u_p$ are formed out of sampled versions of a shaping filter, shifted by propagation delays of the propagation channel.

13. A method according to claim 12, wherein the propagation delays of the propagation channel are previously estimated and standardized.

14. A method according to claim 1, wherein the impulse response of the propagation channel is estimated between a base station and at least one mobile unit in an UMTS (Universal Mobile Telecommunications System) field for uplinks and/or downlinks.

15. A transmission and/or reception device configured to estimate an impulse response of a propagation channel, the device comprising:
    at least one sensor for reception of a signal;
    means for sampling the signal;
    means for estimating a noise from statistics of the propagation channel; and
    means for estimating a matrix of the noise from an empirical covariance matrix of observations $\hat{R}_x$ and from a number of pilot chips of a learning signal transmitted with the signal.

16. A receiver according to claim 15, wherein the matrix of the noise is expressed in the a form:

$$\frac{1}{N_0 P} \hat{R}_x$$

in which $N_0 P$ is the number of pilot chips.

17. A receiver according to claim 15, device further comprising:
    a means for determining the impulse response of the channel in a form:

$$\tilde{H}_m = \left[ \frac{1}{M} \sum_{m=1}^{M} \hat{H}_m \hat{H}_m^H - \frac{1}{N_0 P} \hat{R}_x \right] \Delta^{-1} \hat{H}_m$$

in which $\hat{H}_m$ is an estimated value for the propagation channel, $\Delta$ is a covariance matrix of the estimated channel, $N_0 P$ is a number of pilot chips, $\hat{H}_m^H$ is a conjugate transpose of the estimated value for the propagation channel, M is a number of slots, and $\tilde{H}_m$ is a new estimated value for the propagation channel $\tilde{H}_m$.

18. A receiver according to one of the claims 16 and 17 applied in a field of UMTS (Universal Mobile Telecommunications System).

19. A transmission and/or reception device according to claim 15, the matrix of the noise is expressed in a form:

$$\frac{1}{N_0 P} \hat{R}_x$$

in which $N_0 P$ is the number of pilot chips.

20. A transmission and/or reception device configured to estimate an impulse response of a propagation channel, the device comprising:
    a sensor for reception of a signal;
    a sampler configured to sample the signal;
    a first estimator configured to estimate a noise from a statistics of the propagation channel; and
    a second estimator configured to estimate a matrix of the noise from an empirical covariance matrix of observations and from a number of pilot chips of a learning signal transmitted with the signal.

21. A transmission and/or reception device according to claim 20, the matrix of the noise is expressed in a form:

$$\frac{1}{N_0 P} \hat{R}_x$$

in which $N_0 P$ is the number of pilot chips.

22. A transmission and/or reception device according to claim 20, wherein the covariance matrix is estimated in a form:

$$\Gamma = \frac{1}{M} \sum_{m=1}^{M} \hat{H}_m \hat{H}_m^H - \frac{1}{N_0 P} \hat{R}_x$$

in which $\hat{H}_m$ is an estimated value for the propagation channel, $N_0 P$ is the number of pilot chips, $\hat{H}_m^H$ is a conjugate transpose of the estimated value for the propagation channel, and M is a number of slots.

23. A transmission and/or reception device according to claim 20, wherein the impulse response of the channel is equal to:

$$\tilde{H}_m = \left[ \frac{1}{M} \sum_{m=1}^{M} \hat{H}_m \hat{H}_m^H - \frac{1}{N_0 P} \hat{R}_x \right] \Delta^{-1} \hat{H}_m$$

in which $\hat{H}_m$ is an estimated value for the propagation channel, $\Delta$ is a covariance matrix of the estimated channel, $N_0 P$ is the number of pilot chips, $\hat{H}_m^H$ is a conjugate transpose of the estimated value for the propagation channel, M is a number of slots, and $\tilde{H}_m$ is a new estimated value for the propagation channel $\hat{H}_m$.

24. A transmission and/or reception device according to claim 20, further comprising:
    parametrizing a propagation channel space by an orthonormal base constituted by a given number of vectors $u_1, u_2, \ldots u_p$.

25. A transmission and/or reception device according to claim 24, wherein the propagation delays of the propagation channel are previously estimated and standardized.

26. A transmission and/or reception device according to claim 24, wherein the impulse response of the propagation channel is estimated between a base station and at least one mobile unit in an UMTS (Universal Mobile Telecommunications System) field for uplinks and/or downlinks.

* * * * *